(12) United States Patent
Roy et al.

(10) Patent No.: US 6,401,870 B2
(45) Date of Patent: Jun. 11, 2002

(54) LUBRICATION SYSTEM

(75) Inventors: Subrata Roy, Westmont, IL (US); David E. Susag, Fargo, ND (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/772,241

(22) Filed: Jan. 29, 2001

Related U.S. Application Data (62) Division of application No. 09/296,993, filed on Apr. 22, 1999, now Pat. No. 6,199,663.

(51) Int. Cl.[7] ................................................. F16N 7/30
(52) U.S. Cl. ....................... 184/6.26; 184/55.1; 184/57; 74/606 A
(58) Field of Search ..................... 184/55.1, 57, 50.2, 184/58, 6.12, 6.26, 59; 74/606 R, 607, 606 A (56) References Cited

U.S. PATENT DOCUMENTS

| | | |
|---|---|---|
| 2,541,129 A | 2/1951 | Taber et al. |
| 3,877,547 A | 4/1975 | Willuwelt et al. |
| 4,027,743 A | 6/1977 | Deller et al. |
| 4,448,285 A | 5/1984 | Burgbacher |
| 4,511,016 A | 4/1985 | Doell |
| 5,004,407 A | 4/1991 | Hutchison |
| 5,188,196 A | 2/1993 | Mezzedimi |
| 5,582,271 A | 12/1996 | Mielo |
| 5,623,870 A | 4/1997 | Daniel |
| 5,653,310 A | 8/1997 | Young |
| 5,676,173 A | 10/1997 | Conrad et al. |
| 5,709,627 A | 1/1998 | Teraoka |
| 6,092,628 A | 7/2000 | Hinton et al. |

*Primary Examiner*—David Fenstermacher
(74) *Attorney, Agent, or Firm*—Foley & Lardner (57) ABSTRACT

In one exemplary embodiment, the lubrication system includes a valve between the fluid conduit and the fluid pump, a sensor configured to generate a signal indicative of a viscosity of the fluid and an actuator coupled to the valve, wherein the actuator opens and closes the valve in response to the signal from the sensor.

A method for lubricating and cooling an axle within a housing includes the steps of pumping fluid from a reservoir through a first passage having a first cross sectional area, through a second adjacent passage having a second smaller cross sectional area and through a third passage having a third cross sectional area greater than the second cross sectional area to the interior of the housing. The method also includes the step of providing a source of air to the fluid after the fluid exits the second passage. Air is drawn into the fluid to aerate the fluid. The aerated fluid expels fluid from the interior of the housing to the fluid reservoir. In one exemplary embodiment, the method additionally includes the steps of generating a signal indicative of a viscosity of the fluid and controlling flow of fluid through the first, second and third passages based upon the signal.

19 Claims, 8 Drawing Sheets

LUBRICATION SYSTEM

The present application is a divisional application claiming priority under 35 U.S.C. §120 from U.S. application Ser. No. 09/296,993 filed on Apr. 22, 1999 entitled "LUBRICATION SYSTEM", the full disclosure of which is hereby incorporated by reference, now U.S. Pat. No. 6,199,663.

FIELD OF THE INVENTION

The present invention relates to fluid lubrication systems. In particular, the present invention relates to a lubrication system including simple and inexpensive means for circulating lubricating or cooling fluid from a reservoir through an interior of a housing and back to the reservoir.

BACKGROUND OF THE INVENTION

Axles and pinions of work vehicles, such as tractors and construction equipment, generate considerable friction and heat during use. As a result, such work vehicles include a lubrication system which circulates a lubricating fluid, such as oil, from a reservoir to the interior of a housing about the axle and which returns excess oil from the interior of the housing to the reservoir. Such lubrication systems typically include a dedicated gear pump which supplies lubricating fluid to the housing extending about the axle. Such lubrication systems typically use one of two methods to remove excess fluid from the housing and to return the excess fluid to the reservoir. One method employs an additional dedicated gear pump which pumps excess oil from the housing and returns the excess fluid to the reservoir. Another method employs an additional dedicated gear pump to pump air into the fluid so as to aerate the fluid prior to the fluid entering the housing about the axle. The aerated fluid adds to the air volume in the axle housing to force excess oil through a drain line back to the fluid reservoir.

Although such lubrication systems have been commonly employed for several years, such lubrication systems have several drawbacks associated with the additional required gear pump necessary to pump excess oil out of the axle housing or to pump air into the fluid to aerate the fluid prior to entering the axle housing. First, the additional gear pump is expensive and space consuming. Second, operation of the additional gear pump requires additional power which increases the operating cost of the work vehicle. Third, operation of the additional gear pump creates excessive undesirable noise.

Thus, there is a continuing need for an axle lubrication system that provides appropriately pressurized fluid for axle lubrication and which removes excess fluid from the axle housing while eliminating the additional gear pump and associated power, noise and operating costs.

SUMMARY OF THE INVENTION

The present invention provides a lubrication system that includes a fluid reservoir, a housing having an interior with an inlet and an outlet fluidly coupled to the reservoir, a fluid pump configured to pump fluid from the reservoir to the interior of the housing through the inlet and a fluid conduit between the fluid pump and the inlet. The conduit has inflow portion having a first cross sectional area, an outflow portion having a second cross sectional area and a throat between the inflow portion and the outflow portion. The throat has an exit and a third cross sectional area less than the first and second cross sectional areas. The conduit further includes an aspiration passage extending from a source of air to a location proximate the exit of the throat. Fluid pumped through the fluid conduit by the pump draws air into the outflow portion through the aspiration passage and aerates the fluid. The aerated fluid expels fluid from the interior of the housing through the outlet and back to the fluid reservoir.

In one exemplary embodiment, the lubrication system further includes a valve between the fluid conduit and the fluid pump, a sensor configured to generate a signal indicative of a viscosity of the fluid and an actuator coupled to the valve. The actuator opens and closes the valve in response to the signal from the sensor.

The present invention also provides a fluid conduit for use in a lubrication system having a fluid reservoir, a housing having an interior with an inlet and an outlet fluidly coupled to the reservoir, a fluid pump configured to pump fluid from the reservoir to the interior of the housing through the inlet. The fluid conduit includes at least one member configured to be fluidly coupled between the pump and the inlet of the housing. The at least one member includes an inflow portion having a first cross sectional area, an outflow portion adjacent the first internal portion and having a second cross sectional area, and a throat between the inflow portion and the outflow portion. The throat has an exit and a third cross sectional area less than the first and second cross sectional areas. The conduit further includes an aspiration passage extending from a source of air to a location proximate the exit of the throat. Fluid pumped through the fluid conduit by the pump draws air into the outflow portion through the aspiration passage to aerate the fluid. The aerated fluid expels fluid from the interior of the housing through the outlet and back to the fluid reservoir.

The present invention also provides a method for lubricating and cooling an axle within a housing. The method includes the steps of pumping fluid from a reservoir through a first passage having a first cross sectional area, through a second passage adjacent the first passage and having a second smaller cross sectional area and through a third passage having a third cross sectional area greater than the second cross sectional area to the interior of the housing. The method also includes the step of providing a source of air to the fluid after the fluid exits the second passage. As a result, air is drawn into the fluid to aerate the fluid. The aerated fluid expels fluid within the housing through an outlet of the housing to the fluid reservoir.

According to one exemplary embodiment, the method additionally includes the steps of generating a signal indicative of a viscosity of the fluid and controlling flow of fluid through the first, second and third passages based upon the signal.

DESCRIPTION OF THE PREFERRED EMBODIMENTS

Figure 1:
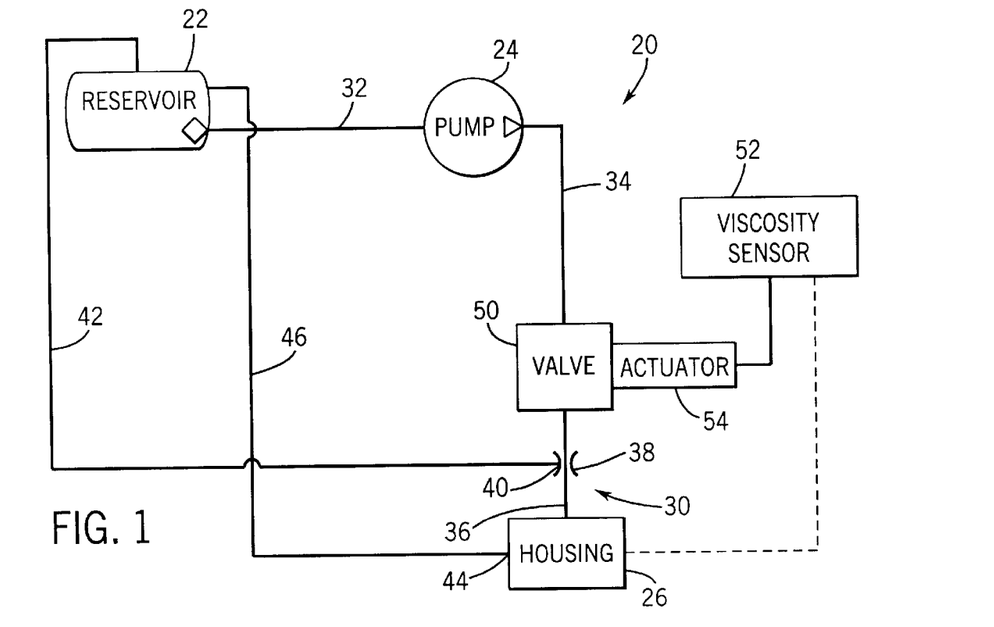
FIG. 1 is a schematic illustration of a first exemplary embodiment of a lubrication system of the present invention.

FIG. 1 is a schematic illustration of a lubrication system 20 for lubricating a high friction component, such as a work vehicle axle (not shown), contained within a housing. Alternatively, lubrication system 20 may be used for lubricating various other high friction components enclosed within housings. For example, lubrication system 20 may be used with any of the variety of gear boxes and housings which are utilized in work vehicles and machine transmissions. Lubrication system 20 generally includes reservoir 22, pump 24, housing 26, and suction pump 30. Reservoir 22 is a conventionally known fluid reservoir configured for containing lubricating fluid used to lubricate friction components at least partially contained within housing 26. Reservoir 22 is fluidly coupled to pump 24 by fluid passage 32.

Pump 24 comprises a conventionally known fluid pump fluidly coupled to reservoir 22 by fluid passage 32 and configured to pump lubricating fluid under pressure through fluid passage 34 into housing 26 through inlet 36 of housing 26. Prior to entering housing 26 through inlet 36, the fluid passes through suction pump 30.

Suction pump 30 comprises a fluid conduit 38 having an aspiration passage 40. Fluid conduit 38 is connected between fluid pump 24 and inlet 36 of housing 26. As described in greater detail hereafter, fluid conduit 38 includes an internal inflow portion extending about an axis and having a first cross sectional area, an internal outflow portion about the axis and having a second cross sectional area and a throat between the inflow portion and the outflow portion. The throat has an exit proximate the outflow portion and a third cross sectional area smaller than the first and second cross sectional areas. Aspiration passage 40 extends from a location proximate the exit of the throat to a source of air. In the exemplary embodiment shown in FIG. 1, aspiration passage 40 is pneumatically connected to fluid reservoir 22 by pneumatic line 42. Pneumatic line 42 is connected to the top portion of fluid reservoir 22 so as to supply aspiration passage 40 with air from reservoir 22. Alternatively, aspiration passage 40 may be provided with air via a variety of different sources.

Housing 26 comprises a generally sealed enclosure about components under high levels of friction, such as axles. Housing 26 contains the lubricating fluid while the lubricating fluid lubricates the friction components. In addition to including inlet 36 through which housing 26 is provided with lubricating fluid, housing 26 also includes outlet 44. Outlet 44 is fluidly coupled to fluid reservoir 22 by fluid passage 46 such that lubricating fluid expelled from housing 26 is returned to fluid reservoir 22.

In operation, reservoir 22 supplies lubricating fluid to fluid pump 24. Fluid pump 24 pumps the fluid under pressure through suction pump 30 and into axle housing 26 through inlet 36. As the fluid is pumped through suction pump 30, the fluid flows through the inflow portion, through the throat, and into the outflow portion. As a result, the fluid flowing through conduit 38 draws air into conduit 38 through aspiration passage 40. The air drawn into conduit 38 through aspiration passage 40 aerates the fluid prior to the fluid entering housing 26. Upon entering housing 26, the aerated fluid pressurizes housing 26 to expel existing fluid from the interior of housing 26 through outlet 44 and back to reservoir 22 through passage 46. As a result, lubrication system 20 provides appropriate pressurized fluid for axle lubrication and removes excess fluid from axle housing 26 without the need for an additional gear pump and its associated power, noise and operating costs. As will be appreciated, additional hydraulic components maybe connected in series or in parallel between reservoir 22, pump 24, suction pump 30 or housing 26.

To draw air through aspiration passage 40 into conduit 38, it is important that the lubricating fluid flowing through suction pump 30 has sufficient velocity. The velocity of the fluid flowing through suction pump 30 is highly dependent upon its viscosity. For this reason, axle lubrication system 20 additionally includes valve 50, sensor 52 and actuator 54. Valve 50 comprising a conventionally known valve formed from one or more components configured to selectively open and close passage 34 to control the flow of lubricating fluid through suction pump 30 and into housing 26 through inlet 36.

Sensor 52 is a conventionally known sensor configured to generate a signal indicative of a viscosity of the fluid. Sensor 52 preferably comprises a temperature sensor configured to directly sense the temperature of the fluid within housing 26. The temperature of the fluid within housing 26 corresponds to the viscosity of the fluid. Sensor 52 generates a signal based upon the sensed temperature of the fluid which corresponds to a viscosity of the fluid and transmits the signal to actuator 54. Alternatively, sensor 52 may sense the temperature of the fluid within any of the fluid passages. In addition, sensor 52 may indirectly sense the temperature of the fluid by sensing ambient air temperature, by sensing the external or internal temperature of individual components of system 20 or of components adjacent circulating lubricating fluid. Moreover, sensor 52 may sense other values or characteristics which correspond to the viscosity of the fluid. For example, sensor 52 may alternatively sense the velocity or density of the fluid as well. Sensor 52 may alternatively sense the temperature of other components of system 20 itself, or other components of the surrounding equipment. For example, if system 20 is used in a work vehicle such as a tractor, sensor 52 may alternatively be configured to sense the temperature of the engine or the oil temperature of the engine by corresponding such data to the viscosity of the fluid. Furthermore, sensor 52 may alternatively directly sense the pressure of the fluid within conduit 38, such as the amount of vacuum or suction presently created by conduit 38.

Actuator 54 is a conventionally known actuator coupled to valve 50 and configured to open and close valve 50 in response to the signal from sensor 52. In the preferred embodiment, actuator 54 comprises an electrically actuated solenoid. Alternatively, actuator 54 may comprise a hydraulic, pneumatic or mechanical actuator.

In operation, sensor 52 generates a signal indicative of the viscosity of the fluid. If the viscosity of the fluid is sufficiently high so as to prevent the fluid from flowing through conduit 38 at a sufficient velocity to draw air into the fluid through aspiration passage 40, the signal causes actuator 54 to close valve 50 to prevent fluid from flowing through conduit 38. As a result, valve 50 prevents fluid from undesirably flowing through aspiration passage 40 due to an insufficient vacuum. Upon receiving a signal from sensor 52 indicating that the viscosity of the fluid is sufficiently low such that the fluid flows with a high velocity, actuator 54 opens valve 50 to enable the fluid to flow through conduit 38. In lieu of actuating valve 50 based upon signals from sensor 52, actuator 54 may alternatively actuate valve 50 between the opened and closed positions based upon other generated signals. For example, actuator 54 may alternatively actuate valve 50 in response to direct manual input by an operator. Actuator 54 may alternatively actuate valve 50 in response to signals based on time. For example, when system 20 is employed in a work vehicle such as a tractor, actuator 54 may alternatively be configured to actuate valve 50 in response to a predetermined amount of time having lapsed since the start-up of the work vehicle indicated by various events such as actuation of the vehicle ignition.

Figure 1A:
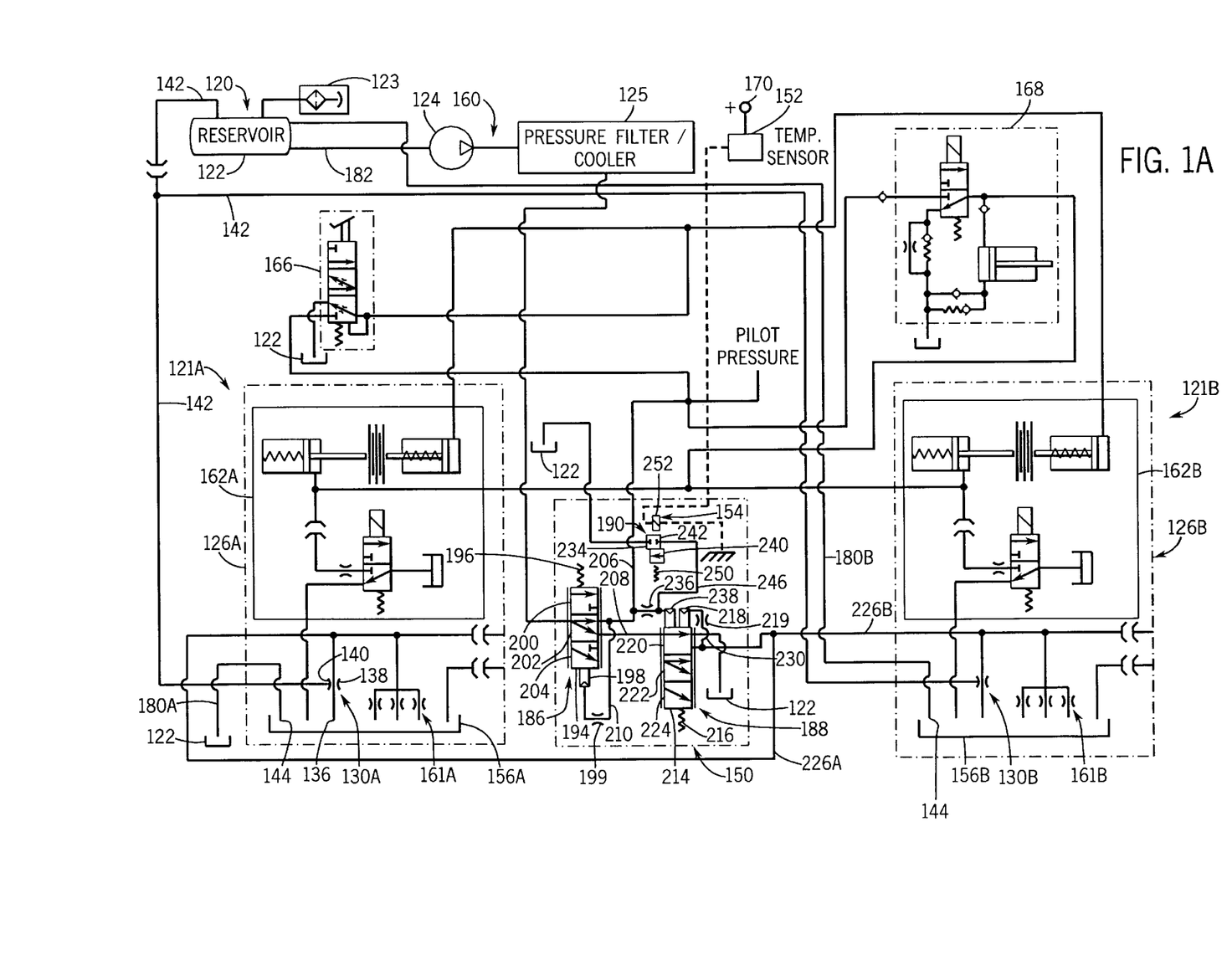
FIG. 1A is a schematic illustration of a second embodiment of the lubrication system of FIG. 1 incorporated into a work vehicle, wherein a valve of the lubrication system is in a closed position.

FIG. 1A is a schematic illustration of lubrication system 120, an alternative embodiment of lubrication system 20, incorporated into a work vehicle 160 to lubricate front axle assembly 121A and rear axle assembly 121B. System 120 generally includes reservoir 122, atmosphere vent 123, pump 124, pressure filter/fluid cooler 125, front axle housing 126A, rear axle housing 126B, suction pumps 130A, 130B, control valve assembly 150, temperature sensor 152 and actuator 154. Work vehicle 160 additionally includes front axle 161A, rear axle 161B, front brake 162A, rear brake 162B, brake pedal control 166, parking brake 168 and electronic ignition 170. Reservoir 122 is similar to reservoir 22 of lubrication system 20 and generally comprises a chamber configured for containing a reserve of hydraulic and lubricating fluid used by system 120 and for use by various other hydraulic and lubrication systems of work vehicle 160. Reservoir 122 is vented by air vent 123. Reservoir 122 is fluidly connected to sumps 156A and 156B of housings 126A and 126B by fluid return lines 180A and 180B, respectively. Reservoir 122 is fluidly connected to pump 124 via fluid line 182. Reservoir 122 supplies hydraulic and lubricating fluid to pump 124 through line 182.

Pump 124 comprises a conventionally known pump and is similar to pump 24 of system 20. Pump 124 pressurizes fluid from reservoir 122 and supplies fluid under pressure to front axle housing 126A and rear axle housing 126B to lubricate front axle 161A and rear axle 161B.

Pressure filter/oil cooler 125 is conventionally known and is configured for filtering and cooling the fluid to a predetermined purity and temperature prior to use in lubricating axles 161A, 161B and in other hydraulic systems of work vehicle of 160.

Suction pumps 130A and 130B are substantially identical to one another and aerate the lubricating fluid prior to the lubricating fluid entering axle housings 126A and 126B. Suction pumps 130A and 130B are substantially identical to suction pump 30 illustrated and described with respect to system 20. In particular, each of suction pumps 130A and 130B includes a conduit 138 and an aspiration passage 140. Conduit 138 is fluidly connected between pump 124 and inlet 136 each of housings 126A and 126B. As will be described in greater detail hereafter, conduit 138 has an inflow portion extending about an axis and having a first cross sectional area, an outflow portion about the axis having a second larger cross sectional area and a throat between the inflow and the outflow portions. The throat has an exit proximate the outflow portion and a third cross sectional area less than the first and second cross sectional areas. Aspiration passage 140 extends from a location proximate the exit of the throat to a source of air. In the exemplary embodiment, aspiration passage 140 is pneumatically connected to an air containing portion of reservoir 122 via air supply line 142. As a result, fluid pumped through the first and second internal portions of fluid conduit 138 by fluid pump 124 draws air into the second internal portion through aspiration passage 140 to aerate the fluid. This aerated fluid pressurizes the interiors of axle housings 126A and 126B to force fluid within sumps 156A and 156B downward so as to expel the fluid from the interior of housings 126A and 126B through outlet 144 and back to reservoir 122 through fluid return lines 180A and 180B.

Control valve assembly 150 is fluidly coupled between pump 124 and suction pumps 130A and 130B. Control valve assembly 150 regulates the pressure of the fluid being supplied to housings 126A and 126B to lubricate axles 161A and 161B. Control valve assembly 150 is further connected to temperature sensor 152 and actuator 154 to control the flow of fluid through suction pumps 130A and 130B to axle housing 126A and 126B, respectively. Control valve assembly 150 generally includes brake pressure regulator 186, lubrication pressure regulator 188 and flow control valve 190. Brake pressure regulator 186 regulates the flow and pressure of fluid supplied from pump 124 to front brake 162, rear brake 164, brake control 166, parking brake 168 and conventionally known pilot pressure requirements of other systems (not shown) of work vehicle 160. Brake pressure regulator 186 generally includes spool 194, bias mechanism 196, hydraulic actuator 198 and restrictor orifice 199. Spool 194 is configured in a conventionally known manner to include flow positions 200, 202 and 204. In position 200, fluid from pump 124 is transmitted to brakes 162, 164, brake control 166, brake 168 and the system's pilot pressure requirements. In position 202, fluid from pump 124 is partially directed to brakes 162, 164, brake control 166, brake 168 and pilot pressure via line 206 and partially to lubrication pressure regulator 188 via line 208. In position 204, fluid from pump 124 is directed to regulator 188 via line 208. Bias mechanism 196, preferably comprising a spring mechanism, biases spool 194 towards position 200. Hydraulic actuator 198 actuates spool 194 against the force of bias mechanism 196 in response to fluid pressure through line 210 and restrictor orifice 199.

In normal operation, spool 194 oscillates between positions 200, 202 and 204 and is in position 202 for a majority of the time. In particular, spool 186 is initially in position 200 until the relatively low pressure requirements of brakes 162 164, control 166, brake 168 and the pilot pressure requirements of vehicle 160 are met. However, once these pressure requirements are met, pressurized fluid applies sufficient pressure upon actuator 198 to move spool 194 into positions 202 and 204.

Lubrication pressure regulator 188 regulates the amount of fluid supplied under pressure to axle housings 126A and 126B. Regulator 188 includes spool 214, bias mechanism 216, hydraulic actuator 218 and restrictor orifice 220. Spool 214 is configured in a conventionally known manner to include flow positions 220, 222 and 224. In position 220, fluid flow from line 208 is entirely directed to reservoir 122. In position 222, flow from line 208 is partially directed to reservoir 122 and is partially directed to suction pumps 130A and 130B and into axle housing 126A and 126B through fluid lines 226A and 226B, respectively. In position 224, fluid flow from line 208 is completely directed to suction pumps 130A and 130B via lines 226A and 226B, respectively. Bias mechanism 216, preferably comprising a spring mechanism, biases the spool 214 towards position 224. Hydraulic actuator 218 moves spool 214 against the force of mechanism 216 towards positions 220 and 222 in response to fluid pressure from fluid line 230 through restrictor orifice 219.

In use, spool 194 oscillates between positions 220, 222 and 224, to supply a predetermined desired amount of pressurized fluid to the interior of axle housing 126A and 126B. Once the lubricating fluid requirements of axle housing 126A and 126B have been met, hydraulic actuator 218 becomes pressurized to move spool 214 to position 220 such that pressurized fluid is dumped to reservoir 122 until additional lubricating fluid is required by axles 161A and 161B.

Flow control valve 190 interrupts the flow of lubricating fluid through suction pumps 130A and 130B and generally includes spool 234, restrictor orifice 236 and hydraulic actuator 238. Spool 234 is a spool configured in a conventionally known manner to include an open position 240 and a closed position 242. In the open position 240, spool 234 allows fluid pressure to flow therethrough to reservoir 122. In the closed position 242, fluid pressure backs up and exerts pressure upon hydraulic actuator 238 which moves spool 214 against bias mechanism 216 towards positions 222 or 220. As a result, in the closed position 242 shown in FIG. 1A, spool 234 causes regulator 188 to interrupt the flow of fluid through suction pumps 130A, 130B by causing regulator 188 to dump all of the fluid into reservoir 122. In the open position 240 shown in FIG. 1B, fluid pressure within line 246 is dumped into reservoir 122 such that minimal fluid pressure is exerted against hydraulic actuator 238 and such that bias mechanism 216 actuates spool 214 into either position 222 or 224 to direct fluid flow to suction pumps 130A and 130B and into axles housing 126A, 126B for lubricating axles 161A and 161B. Spool 234 is actuated between the open position 240 and the closed position 242 by actuator 154.

Actuator 154 actuates spool 234 between the open and closed positions. In the exemplary embodiment, actuator 154 includes a bias mechanism 250 and an electric solenoid 252. Bias mechanism 250 biases spool 234 towards open position 240. Solenoid 252 is electrically coupled to sensor 152 and is configured to move and retain spool 234 in the closed position 242 until receiving an open control signal from sensor 152.

Sensor 152 is coupled to ignition 170 and is configured to generate a signal indicative of a viscosity of the fluid, whereby actuator 154 moves spool 234 between the open position 240 and the closed position 242 in response to the signal generated by sensor 152. In the exemplary embodiment, sensor 152 preferably comprises a temperature sensor configured to sense the temperature of the fluid, which corresponds to a viscosity of the fluid. Sensor 152 preferably includes a control circuit, configured in a conventionally known manner, to generate a control signal that is transmitted to electric solenoid 252 to cause solenoid 252 to move spool 234 to the open position 240 once the fluid has reached a temperature of at least 40 degrees fahrenheit or greater. Electric solenoid 252 requires the electrical control signal from sensor 152 to actuate spool 234 into the closed position 242. As a result, until vehicle 160 is started up by actuation of ignition 170, bias mechanism 250 maintains spool 234 in the open position 240. Once ignition 170 is started, sensor 152 senses the temperature of the fluid and generates a control signal which is transmitted to electric solenoid 252. If the temperature of the fluid is sufficiently cold (i.e. a high viscosity), electric solenoid 252 moves spool 234 to the closed position 240 to prevent fluid from flowing through suction pumps 130A and 130B. As the temperature of vehicle 160 warms up after start-up, sensor 152 generates a control signal to cause actuator 154 to move spool 234 to the open position to enable the supply of lubricating fluid to axles 161A and 161B through suction pumps 130A and 130B. As a result, lubrication system 120 is adapted for use in both warm and cold climates.

Although control valve assembly 150 is illustrated as including brake pressure regulator 186, lubrication pressure regulatory 188 and flow control valve 190, control valve assembly 150 may have a variety of alternative configurations depending upon the type of work vehicle in which system 120 is employed. As will be appreciated, the bias mechanisms, the hydraulic actuators, the electric actuators and spools shown may be replaced with various well-known functional equivalents, using pneumatic, electric, hydraulic, or mechanical power. Moreover, control valve assembly 150 may be simplified or enhanced depending upon the various components of work vehicle 160 and the amount of desired control over those components.

Figure 1B:
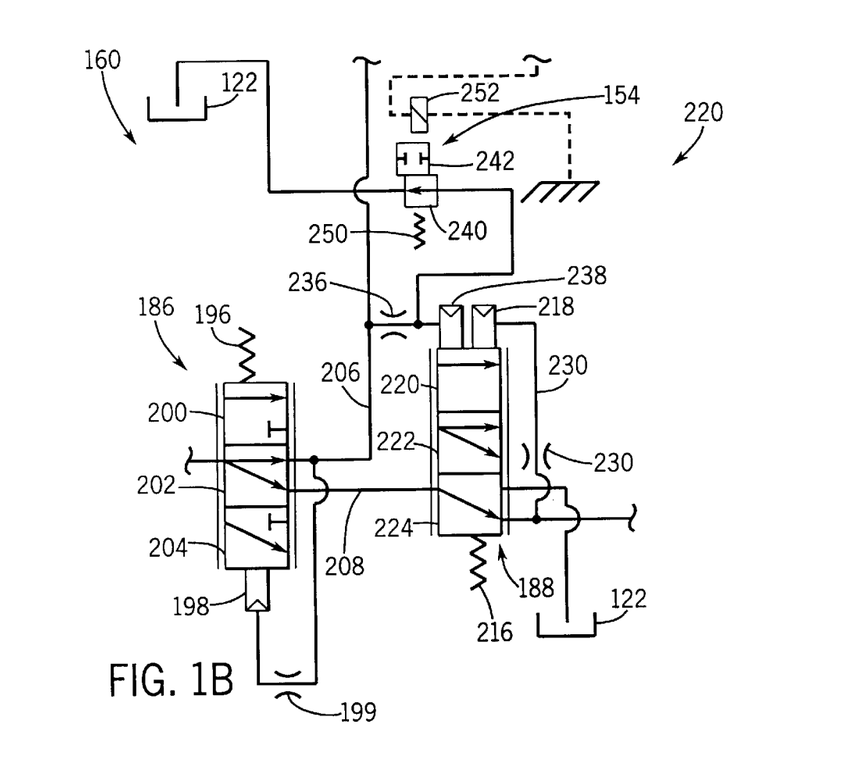
FIG. 1B is a schematic illustration of the valve of FIG. 1A in an open position.
Figure 2:
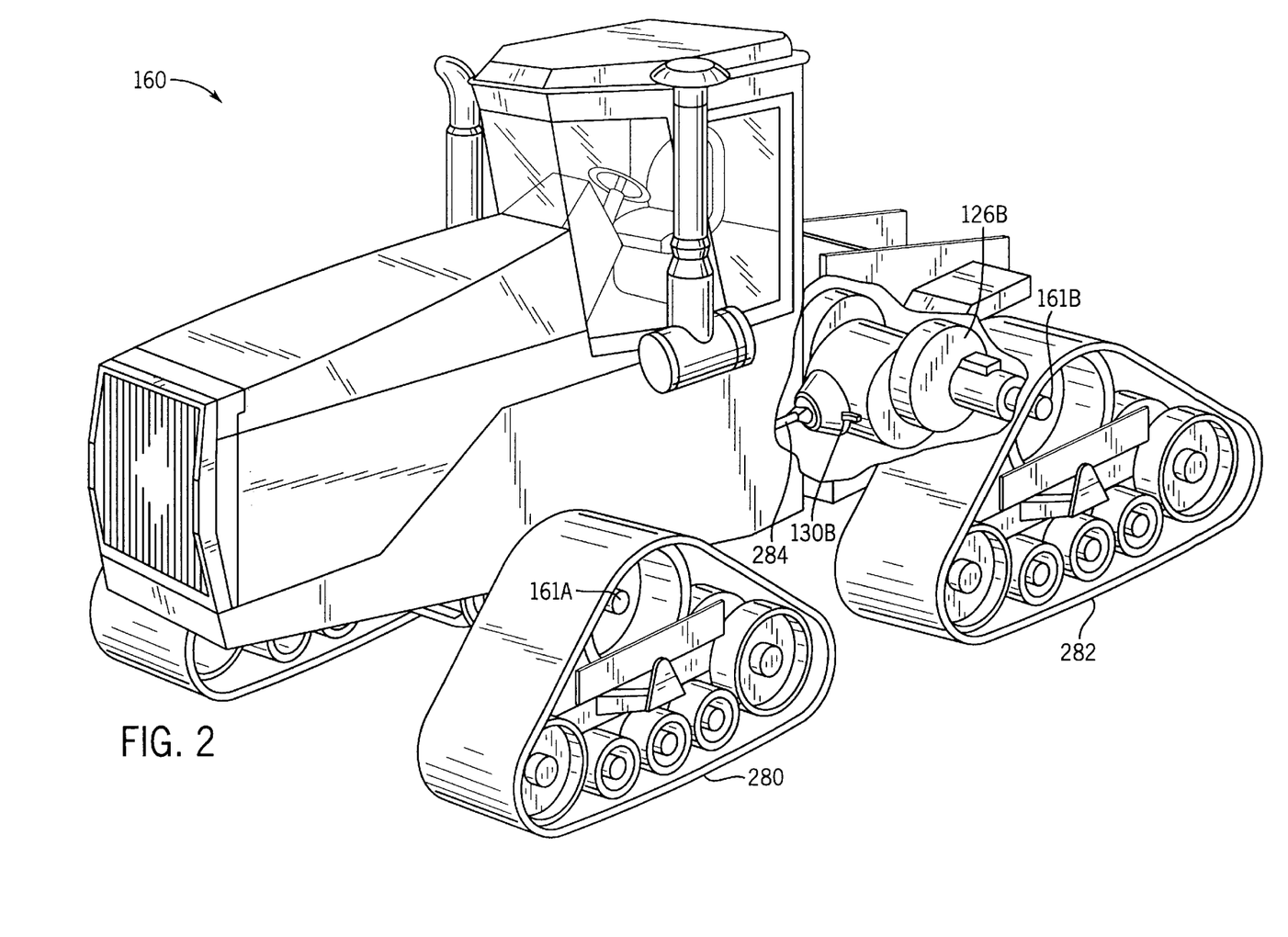
FIG. 2 is a top perspective view of the work vehicle of FIG. 1A with portions removed to illustrate the lubrication system.
Figures 3, 4:
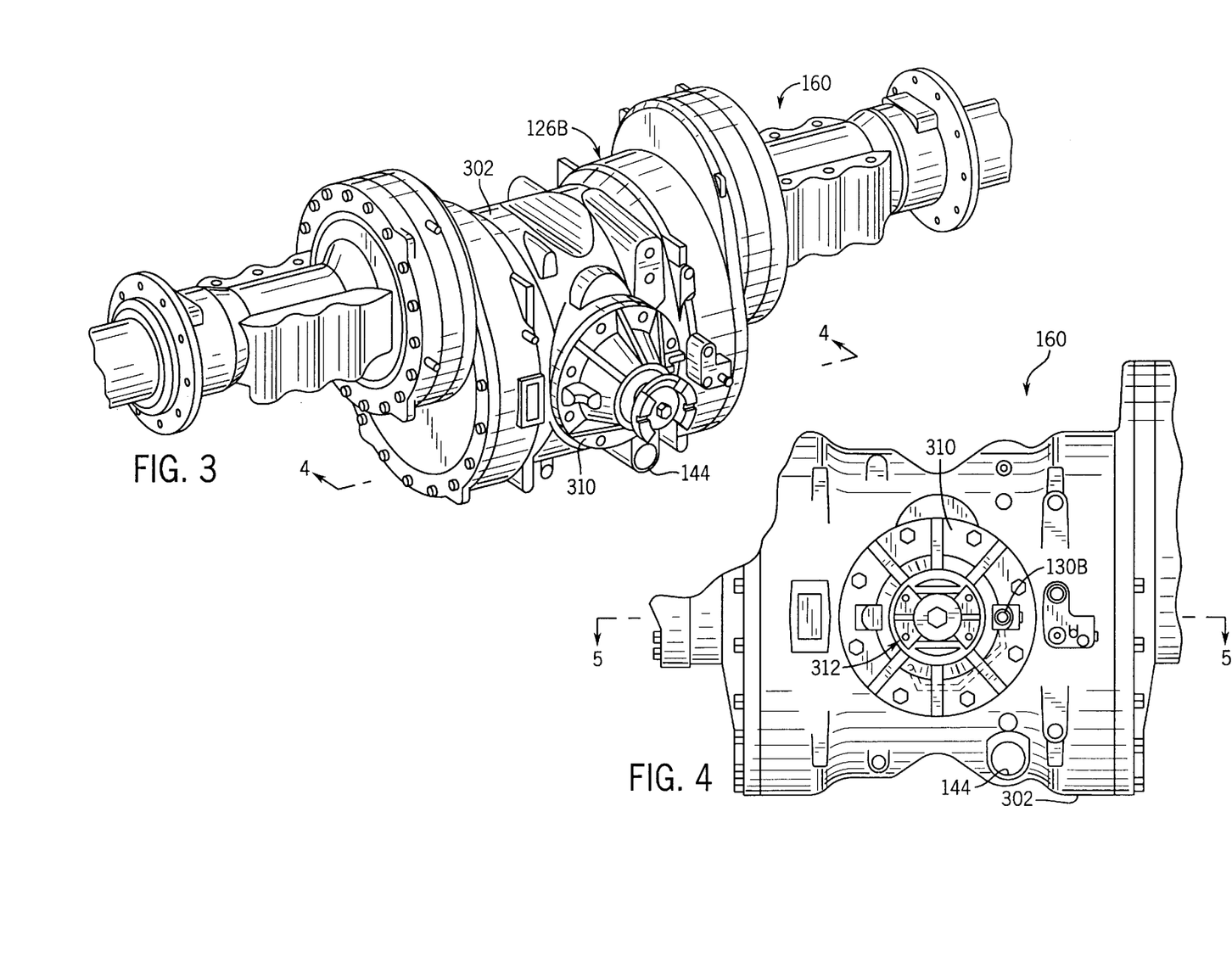
FIG. 3 is a fragmentary top perspective view of a rear axle assembly of the work vehicle of FIG. 2.
FIG. 4 is a fragmentary front elevational view of the rear axle assembly of FIG. 3 taken along lines 4—4.

FIG. 2 is a perspective view of an exemplary embodiment of work vehicle 160 schematically illustrated in FIGS. 1A and 1B. As best shown by FIG. 2, work vehicle 160 comprises an agricultural tractor having front tracks 280 and rear tracks 282 driven by front axle 161A and rear axle 161B, respectively. Portions of work vehicle 160 are removed to better illustrate rear axle housing 126B and suction pump 130B. As shown by FIG. 2, rear axle 161B is rotatably driven by input shaft 284. Although work vehicle 160 is illustrated as an agricultural tracked tractor, work vehicle 160 may alternatively comprise other vehicles for serving various other purposes, such as those used in construction. In addition, work vehicle 160 may alternatively comprise a wheeled agricultural tractor, a wheeled construction vehicle or other wheeled vehicles.

Figure 5:
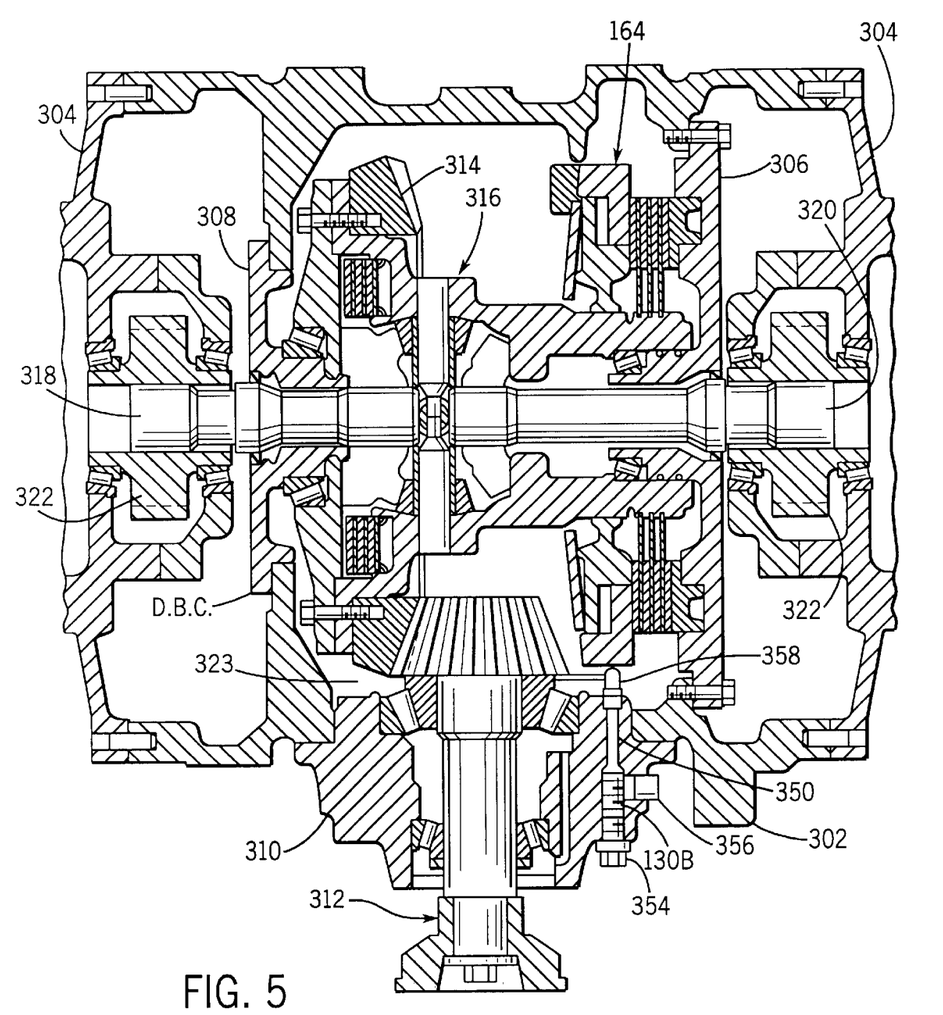
FIG. 5 is a sectional view of the axle assembly of FIG. 4 taken along lines 5—5.

FIGS. 3–6 illustrate rear axle housing 126B enclosing service brake 164 and rear axle 161B while supporting suction pump 130B. As best shown by FIG. 5, rear axle housing 126B generally includes main enclosure 302, differential bearing carriers 306, 308 and cover 310. Enclosure 302 comprises a casing configured to cooperate with enclosures 302, 304, 306, 308 and cover 310 to support and substantially enclose rear axle assembly 121B. In particular, enclosure 302 cooperates with carriers 304, 306, 308 and cover 310 to enclose and support pinion shaft assembly 312, rear drive bevel gear assembly 314, differential assembly 316, drive shafts 318, 320, drive gear 322 and service brake assembly 164. Pinion gear assembly 312, rear drive bevel gear assembly 314, differential assembly 316, drive shafts 318, 320, driven gear 322 and service brake assembly 164 are conventionally known and are not described in detail for purposes of brevity. Pinion shaft assembly 312 extends through and is rotatably supported by cover 310 in meshing engagement with drive bevel gear 314 assembly. Differential assembly 316 operably couples gear 314 to drive shaft 318, 320 in a conventionally known manner. Drive shafts 318 and 320 rotatably drive drive gears 322 which are meshed with corresponding driven gears (not shown) connected to a track axle (not shown). Pinion gear assembly 312 is configured for being operably coupled to an input shaft 284 (shown in FIG. 2). Pinion shaft assembly 312, drive bevel gear 314, differential assembly 316, drive shafts 318, 320 and drive gear 322 transmit torque from input shaft 284 to driven gear and an interconnected track axle (not shown) to drive rear track 282 of work vehicle 160 (shown in FIG. 2) in a conventionally known manner. Service brake assembly 164 is conventionally known and brakes rear tracks 282 in a conventionally known manner. In use, pinion shaft assembly 312, drive bevel gear 314, differential assembly 316, drive shaft 318, 320 and service brake assembly 164 are lubricated by lubrication system 120 which supplies lubricating fluid to the interior 323 of housing 126B through suction pump 130B.

Figure 6:
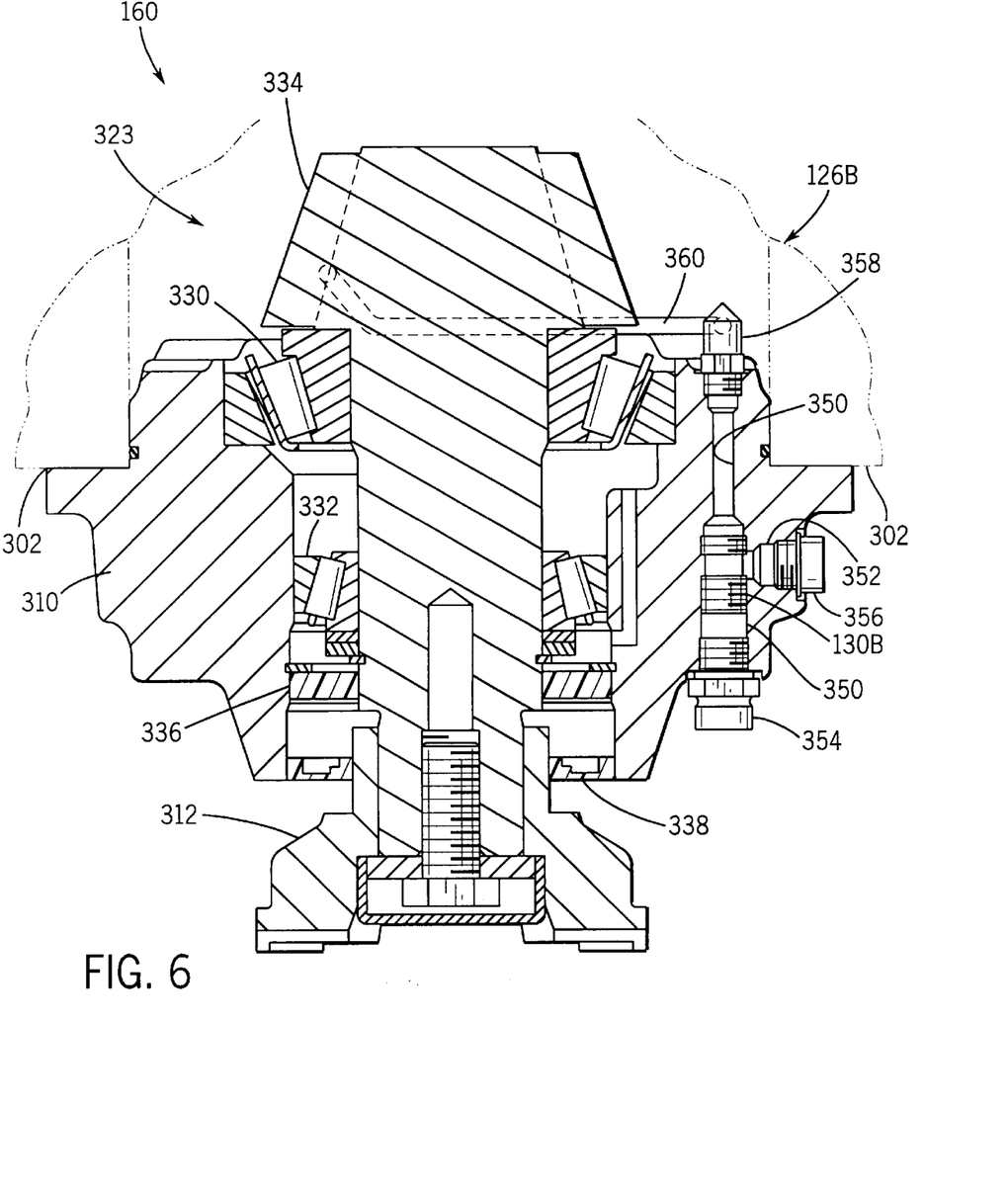
FIG. 6 is an enlarged fragmentary sectional view of the rear axle assembly of FIG. 4 taken along the lines of 5—5.
Figure 7:
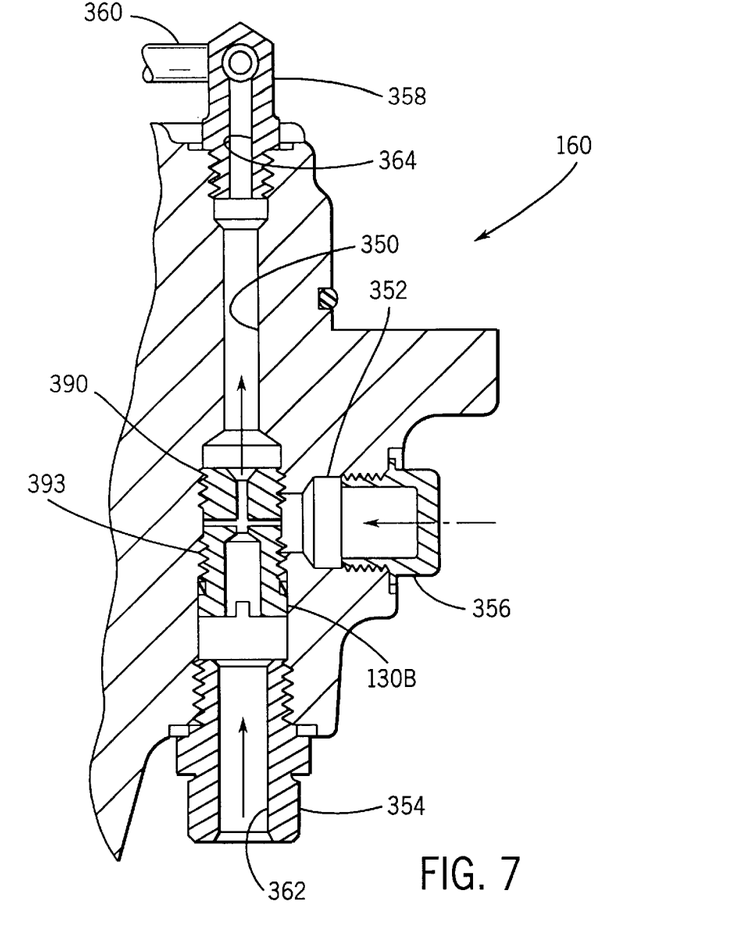
FIG. 7 is a fragmentary sectional view of the rear axle assembly of FIG. 5 illustrating a suction pump of the lubrication system of FIG. 1A.
Figure 8:
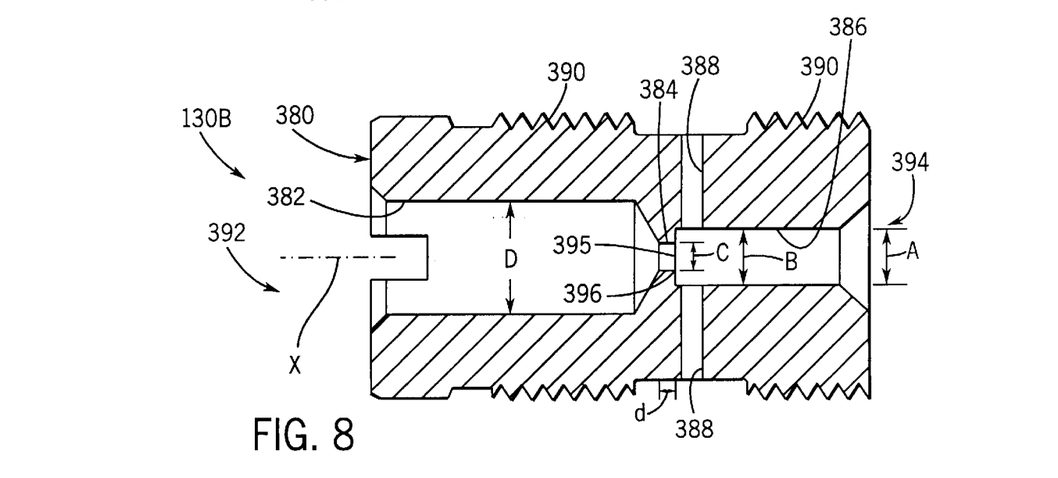
FIG. 8 is a greatly enlarged sectional view of the suction pump of FIG. 7.

FIG. 6–8 illustrate cover 310 and suction pump 130B in greater detail. As best shown by FIG. 6, cover 310 mates and seals against main enclosure 302 to provide the substantially sealed interior 323 of housing 126B. Cover 310 further supports pinion shaft assembly 312 and includes bearings 330, 332 which rotatably support pinion shaft 334 of pinion shaft assembly 312. Cover 310 includes a double lipped seal 336 and cap 338 sealed about pinion shaft assembly 312. As a result, cover 310 prevents the escape of fluid or air from interior 323 of housing 126B.

In addition, cover 310 supports suction pump 130B. As shown by FIGS. 6 and 7, cover 310 includes fluid passage 350, fluid passage 352, connector 354, connector 356, connector 358 and tube 360. Fluid passage 305 extends through cover 310 and is configured for receiving and retaining suction pump 130B adjacent to fluid passage 352. Fluid passage 350 is also preferably configured to retain connectors 354 and 358. Connectors 354 and 358 are each threaded into opposite ends of fluid passage 350 and include internal conduits 362 and 364, respectively. Connector 354 is configured to be coupled to fluid line 226B (shown in FIG. 1A). Connector 358 is configured to be fluidly connected to tube 360. Tube 360 extends from conduit 364 and terminates adjacent to pinion shaft 334 within interior 323.

Fluid passage 352 extends through cover 310 generally perpendicular to fluid passage 350. Fluid passage 352 is configured to communicate with suction pump 130B when suction pump 130B is inserted into fluid passage 350. Fluid passage 352 is configured to retain connector 356. Connector 356 threads into cover 310 within fluid passage 352 and is configured to be connected to air supply line 142 (shown in FIG. 1A). Suction pump 130B is retained within fluid passage 350 adjacent fluid passage 352.

As shown by FIG. 8, suction pump 130B generally comprises a single piece fluid conduit 380 which includes inflow portion 382, throat 384, outflow portion 386, aspiration ports 388 and exterior threads 390. Inflow portion 382, throat 384 and outflow portion 386 coaxially extend through conduit 380 with inflow portion 382 on an inlet side, outflow portion 386 on an outlet side and throat 384 extending between portions 382 and 386. Inflow portion 382 extends from inlet side 392 towards outlet side 394 through throat 384. Inflow portion 382 is generally cylindrical in shape and tapers at its end to throat 384. Cylindrical portion 382 has a diameter B. Fluid flowing through conduit 380 first enters inflow portion 382 prior to entering throat 384.

Throat 384 comprises a fluid passage extending between inflow portion 382 and outflow portion 386. Throat 384 has an exit proximate outflow portion 386. Throat 384 has reduced cross sectional area when compared to both portions 382 and 386. Throat 384 has a diameter C and an axial length d. Fluid flowing through conduit 80 must flow through throat 384 prior to entering outflow portion 386. Because throat 384 has a reduced cross sectional area as compared to inflow portion 382, the velocity of fluid flowing through inflow portion 382 increases once it enters throat 384.

Outflow portion 386 extends from throat 384 to outlet side 394 of conduit 380. Outflow portion 386 has a cross sectional area greater than the cross sectional area of throat 384. In the exemplary embodiment, outflow portion 386 has a diameter B greater than diameter C of throat 384 so as to form an annular step 396 between throat 384 and outflow portion 386. Because outflow portion 386 has a larger cross sectional area as compared to throat 384, fluid flowing at a high velocity from throat 384 into outflow portion 386 creates a vacuum within outflow portion 386 proximate to step 396. This vacuum draws fluid through aspiration ports 388 into outflow portion 386.

Aspiration ports 388 comprise elongate air passages extending through conduit 380 from a location proximate exit 395 to a source of air, preferably fluid passage 352 (shown in FIGS. 6 and 7) which supplies air from reservoir 122 through pneumatic line 142 (shown in FIG. 1A) and through connector 356. In the exemplary embodiment, aspiration ports 388 radially extend through conduit 380 towards the axis of conduit 380. Aspiration ports 388 preferably communicate with the outflow portion 386 proximate step 396.

In the exemplary embodiment, aspiration ports 388 are axially spaced from step 396 by 0.5 to 2.5 times the throat diameter 384. Each aspiration port 388 has an internal diameter less than or equal to the diameter C of throat 384. Preferably, each aspiration port 388 has a diameter of between 0.5 to 1.0 times that of throat 384. Conduit 380 preferably includes approximately four to ten aspiration ports equally spaced about axis X. Optimally, conduit 380 includes six to eight aspiration ports about axis X. In the exemplary embodiment, conduit 380 includes six aspiration ports equally spaced about axis X. It has been discovered that too many aspiration ports about axis X and to few aspiration ports about axis X reduces the amount of fluid drawn through ports 388 due to an inadequate supply of air or an inadequate vacuum.

Threads 390 encircle conduit 380 on opposite axle sides of aspiration ports 388. Threads 390 threadably engage corresponding threads 393 formed along the inner circumferential surface of fluid passage 350. Threads 390 mount conduit 380 within fluid passage 350 adjacent to fluid passage 352. In addition, threads 390 create at least a partial seal between conduit 380 and inner circumferential surface of fluid passage 350.

In the exemplary embodiment, portion 382 has a diameter D of approximately 8.0 millimeters. Throat 384 has a diameter C of approximately 1.8 millimeters ±0.13 millimeters. Outflow portion 386 has a diameter A of approximately 3.86 millimeters ±0.13 millimeters. Aspiration ports 388 each preferably have a diameter of approximately 1.5 millimeters ±0.13 millimeters. Throat 384 preferably has an axial length of approximately 1.5 millimeters. Aspiration ports 388 are preferably axially spaced from step 396 by 4.0 millimeters.

Suction pump 130B draws air through aspiration ports 388 and aerates the fluid flowing through inflow portion 382, throat 384 and outflow portion 386 prior to the fluid flowing into interior 323 of housing 126B to pressurize housing 126B. Air being pumped into interior of housing 126B by suction pump 130B expels excess fluid within housing 126B through outlet 144 back to reservoir 122 via return line 180B. As a result, suction pump 130B easily and inexpensively aerates fluid being pumped into axle housing 126B without the expense, space consumption, power consumption and noise associated with conventional gear pumps commonly used to force excess lubricating fluid out of axle housings. As illustrated and described in detail, suction pump 130A and front axle assembly 121A are substantially similar to suction pump 130B and axle assembly 121B.

In addition to being extremely advantageous over conventional gear driven pumps, suction pump 130B is easily and inexpensively manufactured and installed within cover 310. Because suction pump 130B includes a single piece conduit 380 into which portions 382, 386, throat 384 and aspiration ports 388 are formed, suction pump 130B is compact and does not require assembly of multiple pieces. Moreover, because suction pump 130B does not require multiple pieces which must be assembled together, spacing tolerances between portions 382, 386 and throat 384 as well as aspiration ports 388 may be precisely controlled and established during manufacturing to facilitate simple installation. As a result, suction pump 130B aerates the fluid flowing therethrough in a consistent fashion irregardless of mounting or assembly variances. Furthermore, because suction pump 130B is a single piece, suction pump 130 may be manufactured and easily inventoried for use on differently configured axle coverings or various other structural components of axle housings used in both tracked work vehicles and wheeled work vehicles.

Although suction pump 130B is illustrated as a single piece of venturi configured to mount in cover 310, suction pump 1301B may have various other configurations for drawing air into housing 126B to expel excess fluid from housing 126B. For example, in lieu of a comprising an independent structure mounted into cover 310, conduit 380 may be integrally formed as part of cover 310 whereby portions 382, 386, throat 384 and aspiration ports 388 are formed as part of fluid passage 350. In addition, conduit 380 may alternatively be formed as part of other structural components of housing 126B. Furthermore, conduit 380 may be alternatively configured to be mounted to other structures or integrally formed as part of other structures extending adjacent to or about the fluid line extending between pump 124 and housing 126B anywhere between pump 124 and housing 126B so long as the aeration of the fluid does not interfere with the normal operations of work vehicle 160. Furthermore, suction pump 130B may alternatively be configured as a jet pump and may alternatively be composed of several components which are fastened to one another or mounted adjacent to one another.

Figure 9:
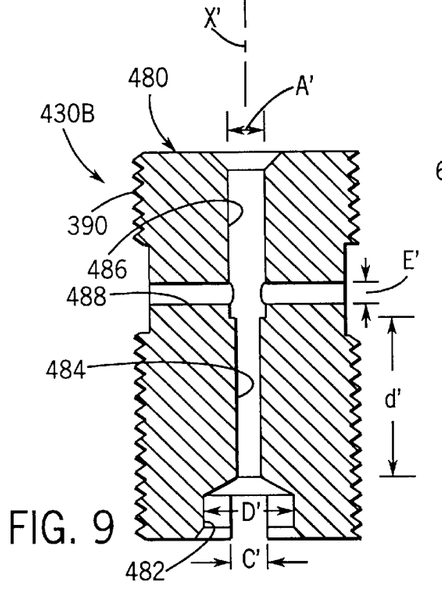
FIG. 9 is a sectional view of the first alternative embodiment of the suction pump of FIG. 8.
Figure 10:
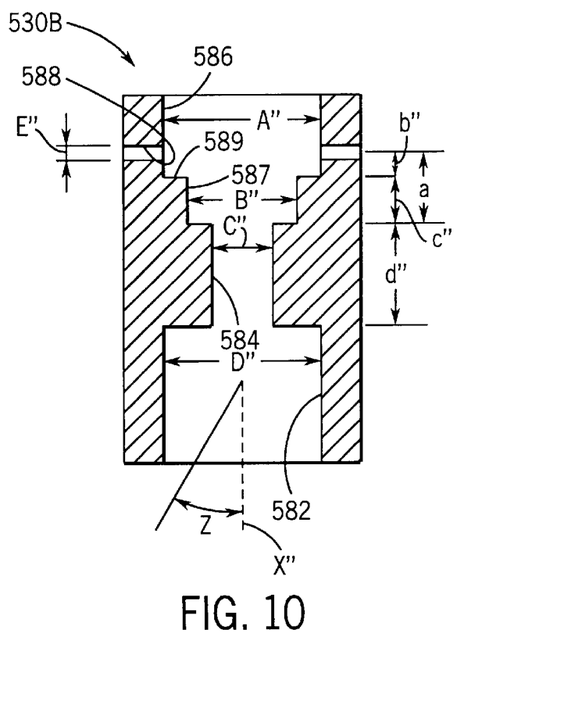
FIG. 10 is a sectional view of a second alternative embodiment of the suction pump of FIG. 8.
Figure 11:
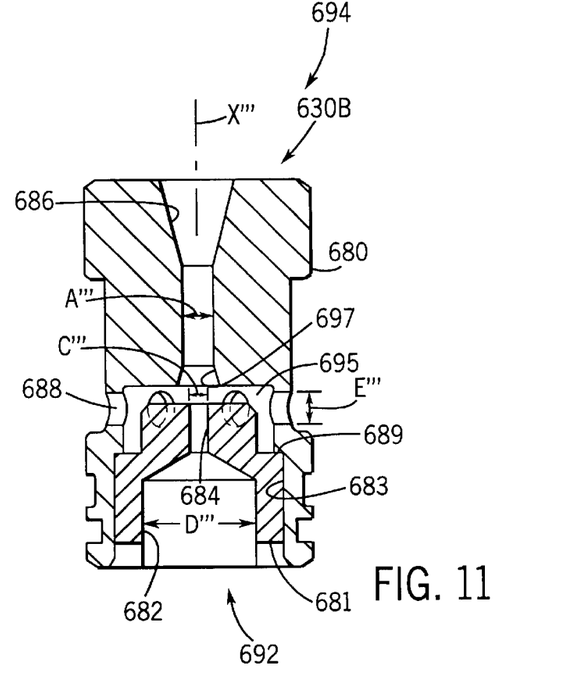
FIG. 11 is a sectional view of a third alternative embodiment of the suction pump of FIG. 8.

FIGS. 9–11 illustrate alternative embodiments of suction pump 130B. FIG. 9 is a sectional view of suction pump 430B. Suction pump 430B is similar to suction pump 130B except that suction pump 430B includes inflow portion 482 and throat 484 in lieu of inflow portion 382 and throat 384. Inflow portion 482 has a shorter axial length as compared to inflow portion 382 while throat 484 has a longer axial length as compared to throat 384. For ease of illustration, those components of suction pump 430B which correspond to similar components of suction pump 130B are numbered similarly. Because throat 484 has an increased length as compared to throat 384, the fluid flowing through throat 484 is more steady and more uniformly directed to create a greater vacuum adjacent to aspiration ports 488 once the fluid enters the outflow portion 486. As a result, the increased vacuum draws in a greater amount of air to better aerate the fluid flowing through suction pump 430B.

In the exemplary embodiment, inflow portion 482 of suction pump 430 has a diameter D' of approximately 6.0 millimeters. Throat 484 has a diameter C' of approximately 1.80 millimeters ±0.13 millimeters. Outflow portion 486 has a diameter A' of approximately 2.50 millimeters. Conduit 480 includes six aspiration ports 488 equally spaced about axis X'. Each aspiration port 488 has a diameter of approximately 1.50 millimeters ±0.13 millimeters. Inflow portion 482 has an axial length of about 6.0 millimeters while throat 484 has an axial length of about 10.0 millimeters. Aspiration ports 488 are axially spaced from exit 495 by about 1.8 millimeters.

Although suction pumps 130B and 430B are illustrated as having the above dimensions, suction pumps 130B and 430B may be alternatively configured to have various other dimensions. FIG. 10 illustrates the dimensioning of single piece suction pump 530. As shown by FIG. 10, suction pump 530 includes inflow portion 582, throat 584, outflow portion 586 and secondary outflow portion 587. Suction pump 530 further includes six aspiration ports 588. Inflow portion 582 has an internal diameter D" extending concentrically about axis X". However, as indicated by dash lines, inflow inlet portion 382 may alternatively be eccentric within respect to axis X" at an angle Z. Throat 584 has an internal diameter of D" and has an axial length of d". Outflow portion 586 has an internal diameter of A". Secondary outlet portion of 87 has an internal diameter of B". Aspiration port 588 has an internal diameter of E" and is axially spaced from throat 584 by a distance a". Aspiration ports 588 are further axially spaced from secondary outlet portion 587 by a distance b". The outermost edge or step 589 of secondary outflow portion 587 is spaced from throat 584 by a distance c". To maximize vacuum and to maximize the amount of secondary fluid (air) drawn through aspiration ports 588 into the primary fluid (preferably lubricating oil), the following conditions should be met:

$A">B">C"<D";$ $E"=(0.5\ to\ 1.0)*C;$ $C"\geq 100\times$ the molecular diameter of the primary fluid.

For c">0 or for c"=0, a"=b", A"=B":

$0.5B"<d"<3D";$ $b"=f(Re, (A"-C")/2)$

Where Re>250
Reynolds No. (Re)=P V Dh/$\mu$;
Where
  Dh=hydraulic diameter;
  V=average velocity of fluid (air flow);
  p=density of primary fluid (oil);
  $\mu$=viscosity of primary fluid (oil).

The amount of vacuum created is a function of Re (Reynolds No.) and the difference between diameter A" and diameter C". The functions for determining axial distance b" and vacuum created by suction pump 530 are set forth and discussed in greater detail in the following references, the full disclosures of which are hereby incorporated by reference:

1. B. F. Armaly, F. Durst, J. C. F. Pereira and B. Schonung, 1983 Journal of Fluid Mechanics, Vol. 127, pp. 473–496.
2. D. K. Gartling, 1990, International Journal for Numerical Methods in Fluids, Vol. 11, pp. 953–967.

3. S. Roy and A. J. Baker, 1998, Numerical Heat Transfer—Part B: Fundamentals, Vol. 33, pp. 5–36.

The above ranges and optimal dimensions may vary depending upon several factors including the temperature and type of primary fluid, the type of secondary fluid/materials being drawn through aspiration ports 588, the atmospheric pressure and temperature, the relative humidity of the secondary fluid, where the secondary fluid is a gas, and the type and amount of suspended particles in the primary and secondary fluids. Although inflow portion 586 of suction pump 530B is illustrated as concentrically extending along and about axis X″, inlet portion 582 may alternatively extend at an angle relative to axis X″. However, as angle Z becomes larger than 0, vacuum losses increase.

FIG. 11 illustrates suction pump 630B, an alternative embodiment of suction pump 130B. As shown by FIG. 10, suction pump 630B is a jet pump having a 2-piece set screw design. Suction pump 630B generally includes orifice member 680 and orifice insert member 681. Orifice member 680 generally includes insert receiving cavity 681, outflow portion 686 and aspiration ports 688. Insert receiving cavity 681 extends from inlet side 692 towards outlet side 694 and is generally configured to receive and retain insert member 681. Cavity 683 extends through member 680 to outlet portion 686. Cavity 683 preferably includes an internal shoulder 689 engaging insert 681 to space insert 681 from internal portion 686 to form gap 695. Gap 695 and aspiration ports 688 provide conduit 680 with an air passage to supply air to exit 695 of throat 684.

Outflow portion 686 extends from cavity 683 along axis X‴ through outlet end 694. Outflow portion 686 includes a funnel shaped mouth 697 adjacent cavity 683. At outlet end 694, internal portion 686 fluidly communicates with interior of housing 126B (shown in FIG. 1) via fluid passage 350 (shown in FIG. 7).

Member 680 preferably includes six aspiration ports 688 equidistantly spaced about axis X‴. Aspiration ports 688 radially extend through member 680 to communicate between a source of air, such as pneumatic line 142 (shown in FIG. 1A) and gap 695 formed between insert 681 and outlet 686 of conduit 680. Aspiration ports 688 allow air to be drawn into the gap 695, wherein the air is further drawn into outlet portion 686 to aerate the fluid flowing through suction pump 630B.

Insert 681 comprises a second piece generally configured for insertion into cavity 683 of member 680. In the exemplary embodiment, insert 681 includes external threads (not shown) adapted to threadably engage internal threads (not shown) of cavity 683. Alternatively inserts, conduit 681 may be retained within cavity 683 by various other mounting or attachment means. Insert 681 generally includes inflow portion 682 and throat 684. Inflow portion 682 has a fluid passage running along axis X‴ from inlet side 692 towards outlet side 694 until in communication with throat 684. Inflow portion 682 is configured for being fluidly coupled to source of pressurized lubricating fluid such as supply line 226B. Throat 684 extends from inlet portion 682 towards outlet end 694 along axis X‴. Throat 684 is in axial alignment with outlet portion 686 and has a inner diameter less than the inner diameter of outlet portion 686. Throat 684 also has an inner diameter less than the inner diameter of inlet portion 682.

During use of suction pump 630B, lubricating fluid enters inflow portion 682 and flows through throat 684. Because throat 684 has a smaller diameter than inlet portion 682, the velocity of the fluid flowing through throat 684 substantially increases. The high velocity fluid then flows across gap 695 and into outlet portion 686. As a high velocity fluid crosses gap 695, the high velocity fluid draws air through the aspiration ports 688 to outlet portion 686, whereby the lubricating fluid becomes aerated. The aerated fluid is then directed through the interior of axial housing 126B (shown in FIG. 5) to pressurize housing 126B and to force excess lubricating fluid up to reservoir 122 (shown in FIG. 1A).

In the exemplary embodiment, inlet portion 686 has an internal diameter C‴ of approximately 2.5 millimeters. Mouth 683 extends outwardly at an angle of approximately 15 degrees and has an axial length of approximately 2.0 millimeters. Aspiration ports 688 each have a diameter of approximately 3.0 millimeters ±0.13 millimeters. Inflow portion 682 has an internal diameter D‴ of approximately 10.0 millimeters. Throat 684 has a diameter C‴ of approximately 1.5 millimeters and an axial length of approximately 3.5 millimeters. When members 680 and 681 are assembled together, throat 684 and outlet portion 686 are axially spaced from one another by approximately 1.5 millimeters. Orifices 688 have center points axially spaced from inlet portions 688 by approximately 1.5 millimeters.

Figure 12:
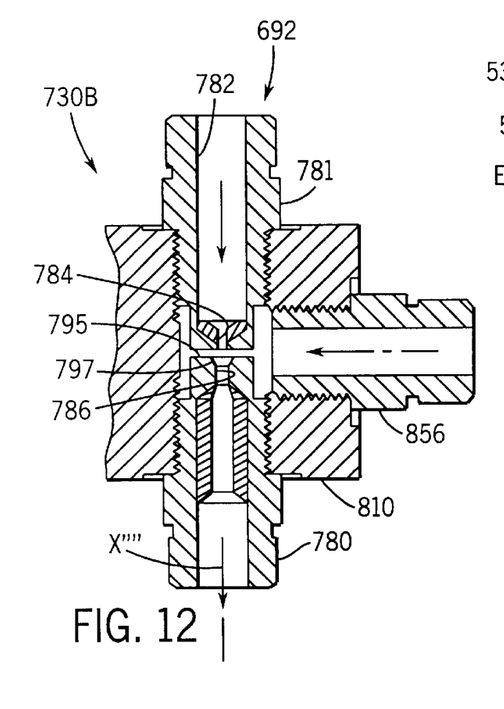
FIG. 12 is a sectional view of a fourth alternative embodiment of the suction pump of FIG. 8 and an intermediate support member adjacent a source of air.

FIG. 11 is a sectional view of suction pump 730B, an alternative embodiment of suction pump 630B. In contrast to suction pump 630B, suction pump 730B includes members 780 and 781 configured to be mounted to an intermediate member 810 adjacent one another as to form a gap 795 therebetween which is in communication with a source of air. Gap 795 functions as an air passage to supply air to exit 795 of throat 784. As shown by FIG. 12, suction pump 730B includes an inlet end 692 and an outlet end 694. Member 781 mounts to cover 810 and generally includes inflow portion 782 and throat 784. Conduit 780 is configured to be mounted to intermediate 810 opposite member 781 along axis X″″ generally includes outflow portion 786. Inflow portion 782 extends from inlet side 692 through member 781 along axis X″″ until in communication with throat 784. Inflow portion 782 preferably tapers to throat 784 to prevent fluid back flow.

Throat 784 extends from inlet portion 782 to gap 795 extending between members 781 and 780. Throat 784 has an interior diameter smaller than inflow portion 782. As a result, fluid entering throat 784 substantially increases in velocity prior to flowing across gap 795 and entering outflow portion 786.

Outflow portion 786 extends from gap 795 towards outlet end 694. Outflow portion 786 includes a widened mouth 797 to facilitate the flow of fluid from throat 784 across gap 795 into outflow portion 786. Outflow portion 786 is in fluid communication with the interior of axle housing 126B (shown in FIG. 5).

During use of suction pump 730B, lubricating fluid is supplied under pressure through inlet portion 782. The fluid increases in velocity as the fluid flows into throat 784. The high velocity fluid exits throat 784 and flows across gap 795 into mouth 797 and further into outlet portion 786. As the high velocity fluid crosses gap 795, the high velocity fluid draws air into gap 795 and into outlet portion 786 through connector 856. This air becomes mixed with the fluid in outlet portion 786 to aerate the fluid prior to the fluid entering axle housing 126B.

As further shown by FIG. 12, the spacing or size of gap 795 is established by mounting member 780 and 781 to an intermediate member 810 opposite one another. In the exemplary embodiment, intermediate member 810 includes internal threads which threadably engage external threads provided on conduit 780 and 781. As will be appreciated, both members 780 and 781 may be coupled and retained to intermediate member 810 opposite one another by various other fastening mounting features or methods. Moreover, conduit 780 and 781 may alternatively be integrally formed as a single unitary body with intermediate member 810. In the exemplary embodiment, inlet portion 782, throat 784, mouth 797, outlet portion 786 and gap 795 have essentially the same dimensions as inlet portion 682, throat 684, mouth 697, outlet portion 686 and gap 695, respectively.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A method for lubricating and cooling an axle within a housing, the method comprising:

pumping fluid through a first passage having a first cross sectional area, through a second adjacent passage having a second smaller cross sectional area and through a third passage having a third cross sectional area greater than the second cross sectional area to the interior of the housing; and providing a source of air to the fluid after the fluid exits the second passage whereby air is drawn into the fluid to aerate the fluid and whereby the aerated fluid pressurizes the interior of the axle housing to expel fluid from the housing through an outlet of the axle housing to the fluid reservoir.

2. The method of claim 1 including:

generating a signal indicative of the viscosity of the fluid; and controlling the flow of the fluid through the first, second and third passages based upon the signal.

3. The method of claim 2 wherein the step of generating a signal indicative of a viscosity of the fluid comprises sensing a temperature of the fluid and generating a signal representing the sensed temperature of the fluid.

4. The method of claim 1 in the second passage and the third passage are separated by a gap wherein the step of providing a source of air includes providing a source of air to the gap.

5. The method of claim 1 wherein the step of providing a source of air includes providing a source of air to the third passage.

6. The method of claim 1 wherein the step of providing a source of air to the fluid includes providing a source of air to the fluid through at least four and less than 11 equally spaced aspiration ports.

7. The method of claim 1 wherein the second passage has an internal diameter C and wherein the step of providing a source of air to the fluid includes providing a source of air to the fluid through at least one aspiration port having an internal diameter of between about 0.5 C. to about 1.0 C.

8. The method of claim 1 wherein the first passage has an internal diameter D and wherein the second passage has an axial length between about 0.5 D and about 3 D.

9. The method of claim 1 wherein the fluid being pumped has a molecular diameter and wherein the second passage has an internal diameter at least 100 times the molecular diameter.

10. The method of claim 1 wherein the first passage, the second passage and the third passage have a Reynolds Number of at least 250.

11. The method of claim 1 wherein the first passage, the second passage and the third passage are coaxial.

12. The method of claim 1 wherein the fluid is pumped from a fluid reservoir and wherein the step of providing a source of air to the fluid includes providing an air conduit from the fluid reservoir to the fluid after the fluid exits the second passage.

13. The method of claim 1 including:

generating a signal indicative of the viscosity of the fluid; and cessating the flow of the fluid through the first, second and third passages based upon the signal.

14. A method for lubricating and cooling an axial within a housing, the method comprising:

directing fluid under pressure through a fluid conduit having an inflow portion with a first cross sectional area, an outflow portion with a second cross sectional area and a throat between the inflow portion and the outflow portion, the throat having an exit proximate the outflow portion and a third cross sectional area less than the first and second cross sectional areas, to an interior of the housing; and providing a source of gas to the fluid at a location proximate the exit of the throat, whereby the fluid flowing through the fluid conduit draws in gas and whereby the gas pressurizes the interior of the housing to expel fluid from the housing.

15. The method of claim 14 including:

generating a signal indicative of the viscosity of the fluid; and controlling the flow of fluid through the fluid conduit based upon the signal.

16. The method of claim 15 wherein the step of generating a signal indicative of a viscosity of the fluid comprises sensing a temperature of the fluid and generating a signal representing the sensed temperature of the fluid.

17. A method for lubricating and cooling moving members contained within a housing, the method comprising:

pumping fluid through a first passage having a first cross sectional area, through a second adjacent passage having a second smaller cross sectional area and through a third passage having a third cross sectional area greater than the second cross sectional area to the interior of the housing; and providing a source of air to the fluid after the fluid exits the second passage, whereby air is drawn into the fluid to aerate the fluid and whereby the aerated fluid pressurizes the interior of the housing to expel fluid from the housing through an outlet of the housing to the fluid reservoir.

18. The method of claim 17 including:

generating a signal indicative of the viscosity of the fluid; and controlling the flow of the fluid through the first, second and third passages based upon the signal.

19. The method of claim 18 wherein the step of generating a signal indicative of a viscosity of the fluid comprises sensing a temperature of the fluid and generating a signal representing the sensed temperature of the fluid.

* * * * *